US 8,640,841 B2

(12) United States Patent
Cai et al.

(10) Patent No.: US 8,640,841 B2
(45) Date of Patent: Feb. 4, 2014

(54) BIDIRECTIONAL DRIVING DEVICE

(75) Inventors: Chengxin Cai, Xiangfan (CN); Yuanhe Gao, Xiangfan (CN)

(73) Assignee: Hubei Aviation Precision Machinery Technology Co., Ltd., Xiangfan, Hubei Province (CN)

( * ) Notice: Subject to any disclaimer, the term of this patent is extended or adjusted under 35 U.S.C. 154(b) by 652 days.

(21) Appl. No.: 12/681,562

(22) PCT Filed: Oct. 10, 2008

(86) PCT No.: PCT/CN2008/072638
§ 371 (c)(1),
(2), (4) Date: Apr. 2, 2010

(87) PCT Pub. No.: WO2009/049540
PCT Pub. Date: Apr. 23, 2009

(65) Prior Publication Data
US 2010/0206679 A1 Aug. 19, 2010

(30) Foreign Application Priority Data
Oct. 12, 2007 (CN) .......................... 2007 1 0163587

(51) Int. Cl.
*F16D 41/16* (2006.01)
*B60N 2/16* (2006.01)
(52) U.S. Cl.
USPC ...................................... 192/43.1; 192/223.1
(58) Field of Classification Search
USPC ........... 192/43.1, 223.1; 248/421; 297/344.12
See application file for complete search history.

(56) References Cited

U.S. PATENT DOCUMENTS

| 5,881,854 A * | 3/1999 | Rougnon-Glasson | 192/15 |
| 6,253,894 B1 * | 7/2001 | Schumann et al. | 192/15 |
| 6,520,583 B1 * | 2/2003 | Bonk | 297/367 R |
| 6,575,278 B1 * | 6/2003 | Schumann et al. | 192/19 |
| 6,578,803 B2 * | 6/2003 | Mukugaichi | 248/157 |
| 2010/0206679 A1 * | 8/2010 | Cai et al. | 192/43.1 |

FOREIGN PATENT DOCUMENTS

| CN | 1799899 A | 7/2006 |
| CN | 201099185 Y | 8/2008 |
| DE | 19924816 | 1/2001 |
| FR | 2717751 | 9/1995 |
| JP | 2000255295 A | 9/2000 |
| JP | 2001333830 A | 12/2001 |
| JP | 2002320528 A | 11/2002 |

* cited by examiner

*Primary Examiner* — David D Le
*Assistant Examiner* — Steven B Christ
(74) *Attorney, Agent, or Firm* — Workman Nydegger

(57) ABSTRACT

A bidirectional driving device includes a ratchet wheel, a movable handle, a fixed casing, a pawl reset spring, a handle reset spring and a central shaft. The handle reset spring is in an inner hole of the ratchet wheel. A positioning column of the handle reset spring is placed in sliding slots of the movable handle and of the fixed casing. First and second pawls are disposed between the ratchet wheel and the movable handle. Tooth sections of the first and second pawls are engaged with ratchet teeth of the ratchet wheel. Positioning columns of the first and second pawls are connected with the movable handle. Bosses of the first and second pawls are placed in sliding slots of the fixed casing, each composed of two circular arc slot sections with different radius. The pawl reset spring is connected with the bosses and with the central shaft.

15 Claims, 6 Drawing Sheets

US 8,640,841 B2

BIDIRECTIONAL DRIVING DEVICE

CROSS REFERENCE TO RELATED APPLICATION

This application claims the benefit of CN Patent Application No. 200710163587.8, entitled "A BIDIRECTIONAL DRIVING DEVICE" filed on Oct. 12, 2007 with the State Intellectual Property Office of PRC, which is hereby incorporated herein by reference in its entirety.

FIELD OF THE INVENTION

The present invention relates to the field of machinery technology, in particular to a bidirectional driving device.

BACKGROUND

In a modern automobile, a self-locking transmission or braking mechanism is often used to adjust various positions, for example, to adjust the height of a seat.

With respect to a step transmission device used for converting an alternate lifting and lowering movement into an incontinuous rotating movement, various solutions have been proposed in the field of vehicle seat, among which a seizing roller one-way pulley and a pawl braking mechanism are commonly used.

However, the existing pawl braking mechanisms generally have a complicated structure, occupy a large space and mostly adopt a one-way rotating manner. That is to say, if the most suitable height is missed when the height of the seat is adjusted, it is necessary to re-adjust after resetting, causing much trouble.

SUMMARY OF THE INVENTION

In view of this, the embodiment of the present invention provides a bidirectional driving device that is convenient in adjusting the height of the seat.

A bidirectional driving device is provided comprising a ratchet wheel, a movable handle, a fixed casing and a central shaft passing through the movable handle and the fixed casing.

A handle reset spring is disposed at an inner hole of the ratchet wheel, a first free end and a second free end of the handle reset spring are placed in a fourth sliding slot of the fixed casing after passing through a third sliding slot of the movable handle.

A first pawl and a second pawl located in the same mounting plane are disposed between the ratchet wheel and the movable handle, and are respectively provided with a boss, a tooth section and a positioning column for connecting the movable handle, the bosses are placed in a first sliding slot and a second sliding slot of the fixed casing.

A pawl reset spring is connected with the first boss, the second boss and the central shaft, such that the first tooth section and the second tooth section have a tendency to move toward ratchet teeth of the ratchet wheel.

When a force is present to cause the movable handle to rotate with the central shaft as a center, the tooth section of one of the first pawl and the second pawl is engaged with the ratchet teeth, the tooth section of the other is disengaged from the ratchet teeth, whereby the ratchet wheel is driven to rotate synchronically, and when the force is removed, the handle returns to the original position under the action of the handle reset spring.

Preferably, in the device, each of the first sliding slot and the second sliding slot is composed of two circular arc slot sections with different radius.

Preferably, in the device, the pawl reset spring is disposed between the fixed casing and the movable handle.

Preferably, in the device, the handle reset spring is disposed between the movable handle and the mounting plane where the first pawl or the second pawl is located.

Preferably, in the device, the pawl reset spring comprises a first arm hook, a second arm hook and a positioning part, the first arm hook and the second arm hook are respectively connected with the first boss and the second boss, and the positioning part is connected with the central shaft.

Preferably, in the device, the first boss and the second boss respectively pass through a fifth sliding slot and a sixth sliding slot provided on the movable handle and are connected to the first sliding slot and the second sliding slot f the fixed casing.

Preferably, in the device, the length of the fifth sliding slot or the sixth sliding slot is equal to the difference between the radiuses of the two circular arc slot sections.

Preferably, in the device, the height of the first positioning column or the second positioning column is smaller than or equal to the thickness of the movable handle.

Preferably, in the device, the first boss or the second boss is a cylindrical boss.

According to the above description, compared with the prior art, the embodiment of the present invention has the following advantages and features: in the embodiment of the present invention, the teeth of the first pawl and the second pawl are engaged with the ratchet teeth of the ratchet wheel, and the positioning columns provided on the first pawl and the second pawl are connected with the handle, the bosses provided on the first pawl and the second pawl are respectively placed in the two sliding slots of the fixed casing; since each of the sliding slots is composed of two circular arc slot sections with different radius, when the handle is rotated clockwise or counterclockwise, due to the positional restriction by the sliding slots, the teeth of one of the first pawl and the second pawl are securely engaged with the ratchet teeth of the ratchet wheel, and the teeth of the other is disengaged from the ratchet teeth of the ratchet wheel, thus the ratchet wheel is rotated synchronically with the handle by the first pawl or the second pawl. Moreover, by the action of the handle reset spring, the handle can be reset automatically. In addition, the pawl reset spring can cause one end of each of the first pawl and the second pawl mounted with the tooth section to have a tendency to move toward the ratchet teeth of the ratchet wheel. In the present invention, with the sliding slot composed of the slot sections with different radius and with the pawl reset spring, when the handle is rotated, only one of the first pawl and the second pawl securely catches the ratchet teeth, therefore, the purpose to control the ratchet wheel to move toward one direction is achieved. The embodiment of the present invention may conveniently perform a bidirectional driving, be convenient in use, have a simple structure and occupy a small space.

DETAILED DESCRIPTION OF THE INVENTION

Figure 1:
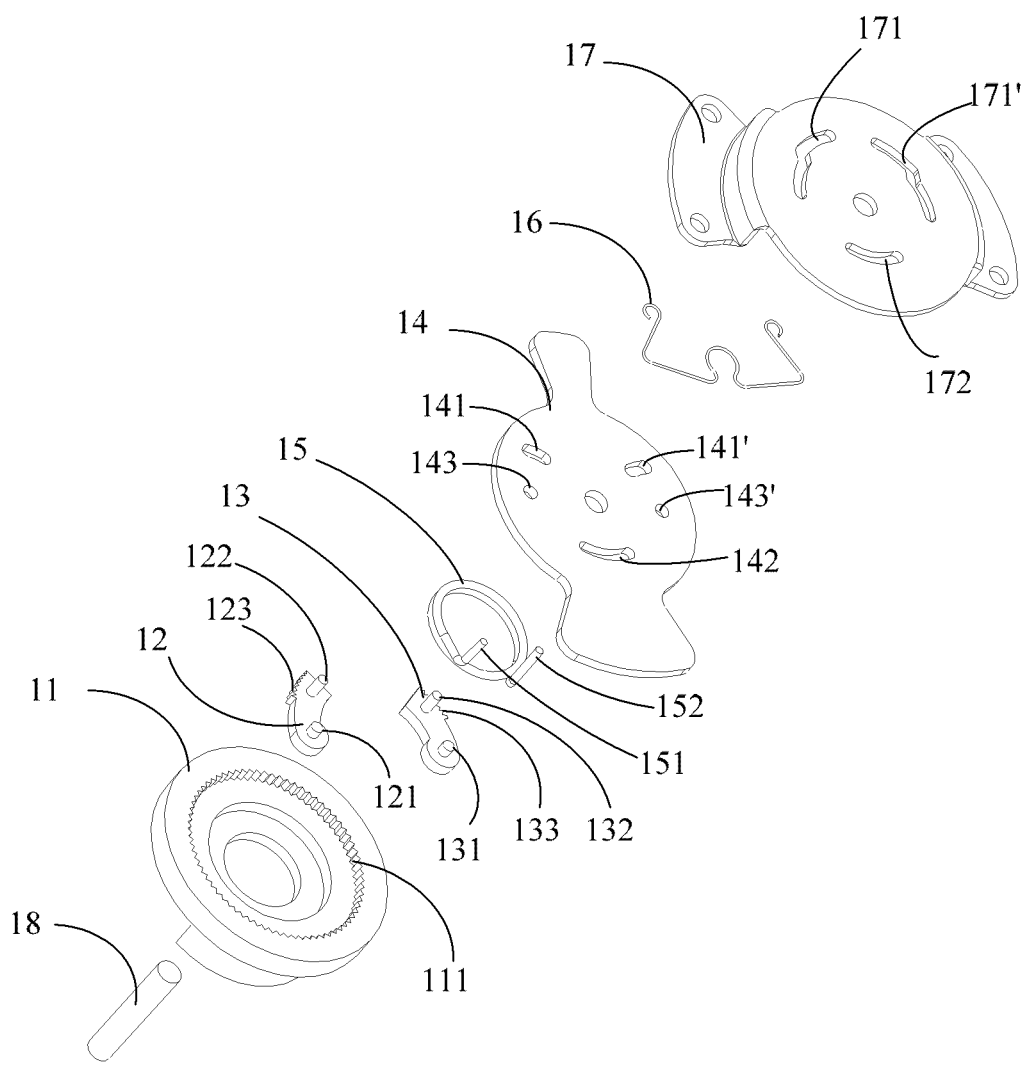
FIG. 1 is an exploded view of a first structure of the bidirectional driving device provided by the embodiment of the present invention.
Figure 2:
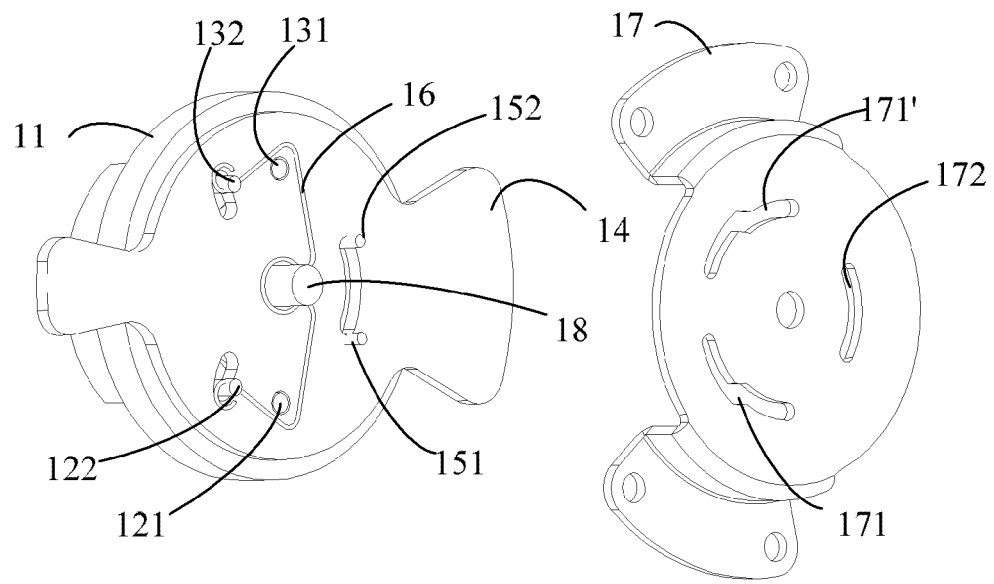
FIG. 2 is an exploded view of a second structure of the bidirectional driving device provided by the embodiment of the present invention.
Figure 3:
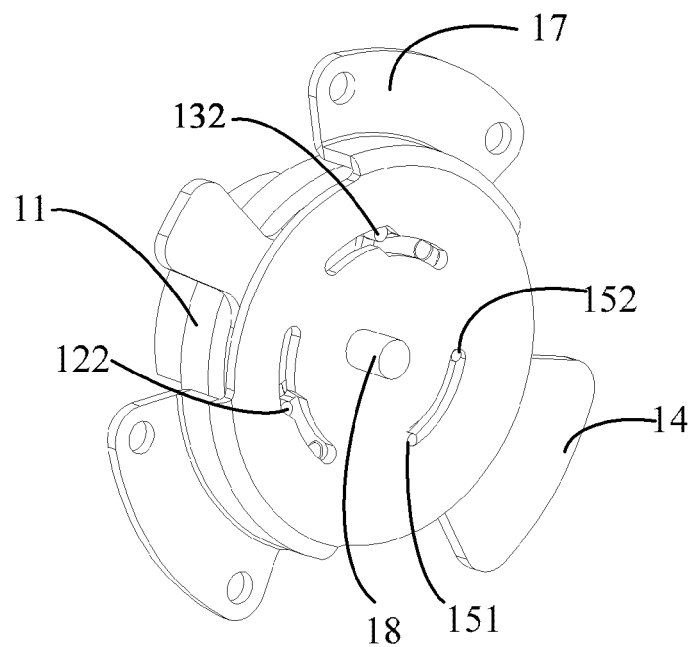
FIG. 3 is an assembly view of the bidirectional driving device provided by the embodiment of the present invention.

Referring to FIGS. 1 to 3, wherein, FIG. 1 is an exploded view of a first structure of a bidirectional driving device provided by an embodiment of the present invention, FIG. 2 is an exploded view of a second structure of the bidirectional driving device, and FIG. 3 is an assembly view of the bidirectional driving device.

The bidirectional driving device includes a ratchet wheel 11, a movable handle 14 and a fixed casing 17, which are connected through a central shaft 18. A first pawl 12, a second pawl 13 and a handle reset spring 15 are disposed between the ratchet wheel 11 and the movable handle 14, and the first pawl 12 and the second pawl 13 are located in the same mounting plane. A first tooth section 123 of the first pawl 12 and a second tooth section 123 of the second pawl 13 are engaged with ratchet teeth 111 of the ratchet wheel 11. A first positioning column 121 of the first pawl 12 is connected with a first fixing hole 143 of the movable handle 14, and a first boss 122 of the first pawl 12 passes through both of a fifth sliding slot 141 of the movable handle 14 and a first sliding slot 171 of the fixed casing 17. Similarly, a second positioning column 131 of the second pawl 13 is connected with a second fixing hole 143' of the movable handle 14, and a second boss 132 of the second pawl 13 passes through both of a sixth sliding slot 141' of the movable handle 14 and a second sliding slot 171' of the fixed casing 17.

The handle reset spring 15 includes two free ends (a first free end 151 and a second free end 152) bent at 90 degrees and passing through both of a third sliding slot 142 provided at the movable handle 14 and a fourth sliding slot 172 provided at the fixed casing 17.

One pawl reset spring 16 is disposed between the movable handle 14 and the fixed casing 17, and includes two arm hooks (a first arm hook 161 and a second arm hook 161, not shown in the Figure). The first arm hook 161 is connected with the first boss 122 of the first pawl 12, and the second arm hook 161 is connected with the second boss 132 of the second pawl 13.

Figure 4:
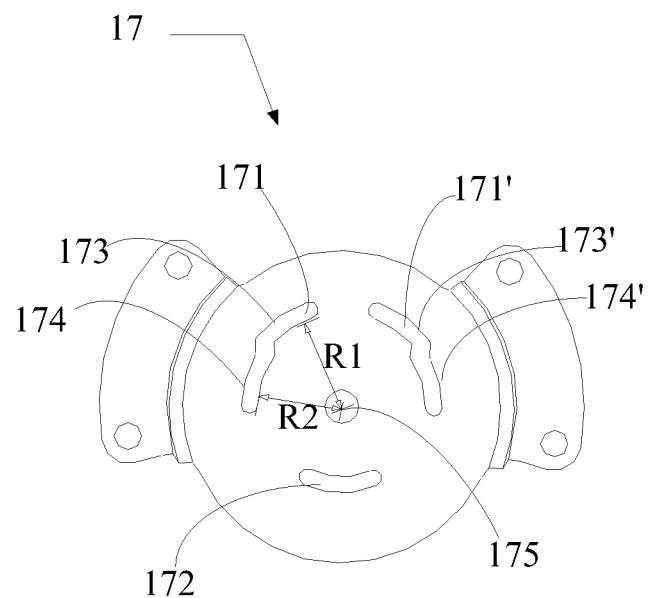
FIG. 4 is a schematic view of the fixed casing of the bidirectional driving device provided by the embodiment of the present invention.

FIG. 4 shows a schematic view of the fixed casing of the bidirectional driving device.

The fixed casing is provided thereon with the first sliding slot 171, the second sliding slot 171', the fourth sliding slot 172 and a central hole 175 for connecting with the central shaft 18. The first sliding slot 171 is composed of a slot section 173 and a slot section 174, and the second sliding slot 171' is composed of a slot section 173' and a slot section 174'. The slot sections 173, 173', 174, 174' are all circular arc sliding slots. The slot sections 173 and 173' have a radius of R1, and the slot sections 174 and 174' have a radius of R2 wherein R1>R2.

Figure 5:
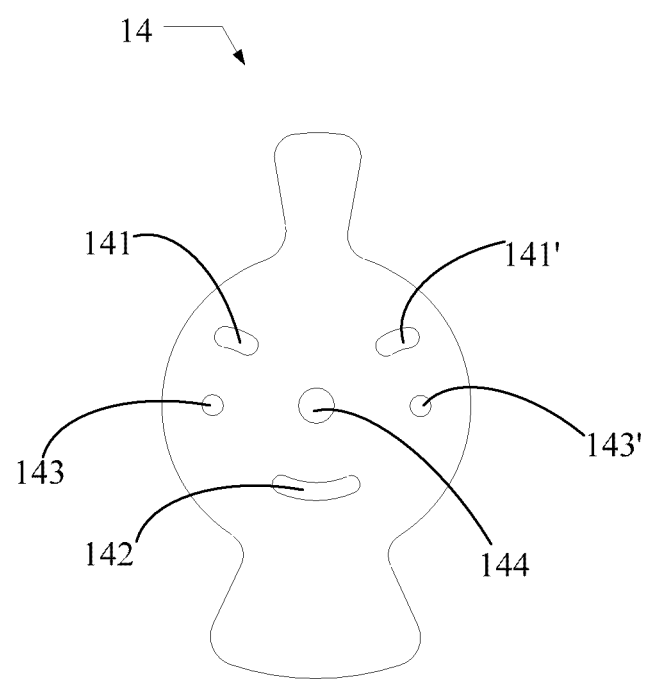
FIG. 5 is a schematic plan view of a first embodiment of the movable handle of the bidirectional driving device provided by the embodiment of the present invention.

FIG. 5 shows a schematic plan view of the movable handle 14 of the bidirectional driving device.

The movable handle 14 is provided thereon with the fifth sliding slot 141, the sixth sliding slot 141', the third sliding slot 142, the positioning hole 143, the positioning hole 143 and a central hole 144 for connecting with the central shaft. The fifth sliding slot 141 and the sixth sliding slot 141' have a length of d, and d>(R1−R2).

Figure 6:
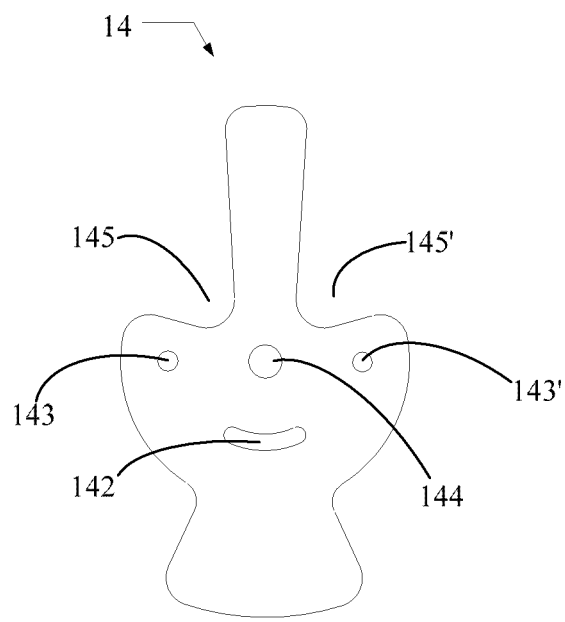
FIG. 6 is a schematic plan view of a second embodiment of the movable handle of the bidirectional driving device provided by the embodiment of the present invention.

FIG. 6 shows another structure of the movable handle 14, on which a recess 145, a recess 145', the third sliding slot 143, the positioning hole 143, the positioning hole 143 and the central hole 144 for connecting with the central shaft are provided.

Figure 7:
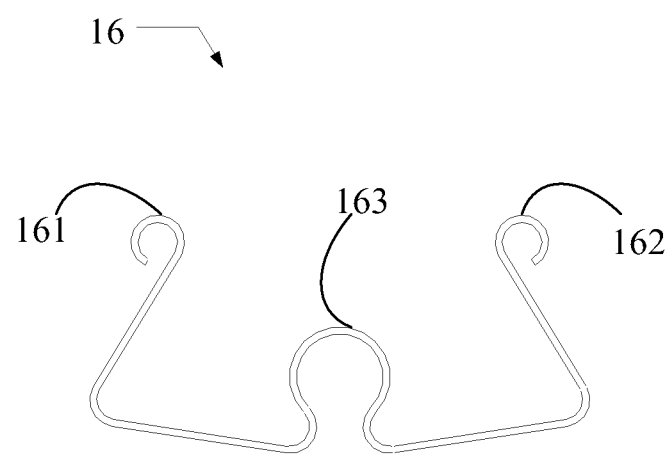
FIG. 7 is a structural schematic view of the pawl reset spring of the bidirectional driving device provided by the embodiment of the present invention.

FIG. 7 shows a structural schematic view of the pawl reset spring 16 of the bidirectional driving device.

The pawl reset spring 16 has a shape as shown in FIG. 7, and includes the first arm hook 161 and the second arm hook 162. The first and second arm hooks 161 and 162 are respectively used for connecting with the first boss 122 of the first pawl 12 and the second boss 132 of the second pawl 13. The pawl reset spring 16 further includes a positioning part 163 in a circular arc structure for connecting with the central shaft 18.

It should be noted that the pawl reset spring 16 may be disposed between the movable handle 14 and the fixed casing 17, and also may be disposed between the first pawl 12 or the second pawl 13 and the movable handle 14.

Figure 8:
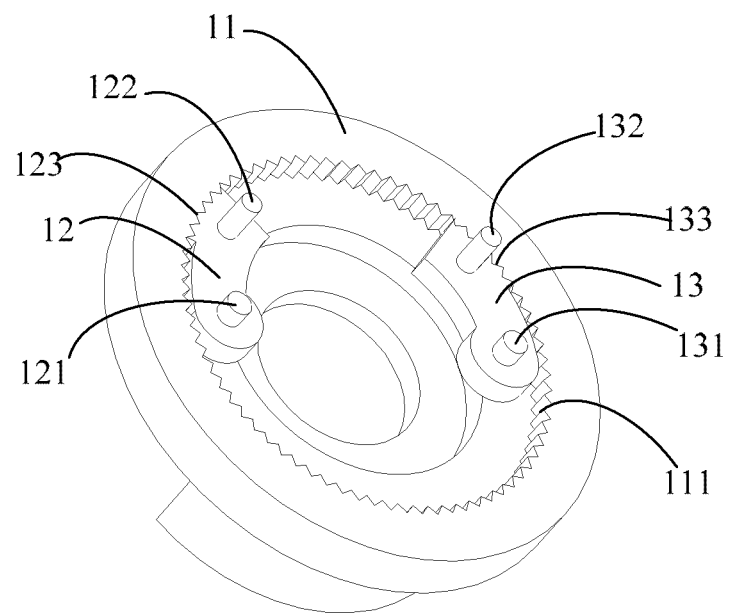
FIG. 8 is a structural schematic view of the connection relationship among the first pawl, the second pawl and the ratchet wheel of the bidirectional driving device provided by the embodiment of the present invention.
Figure 9:
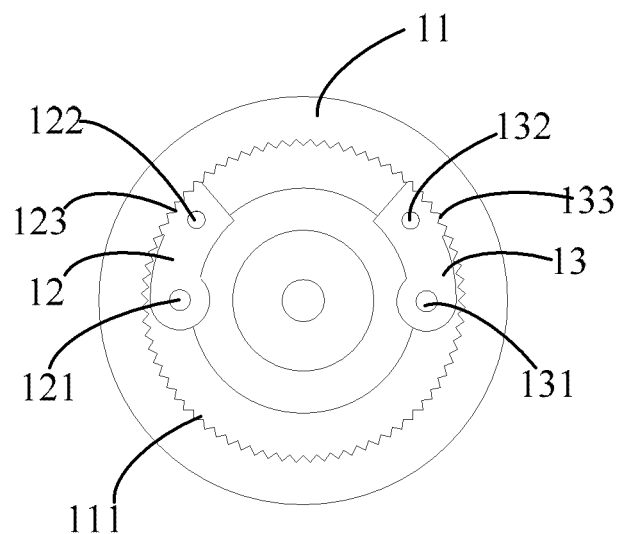
FIG. 9 is a structural schematic plan view of FIG. 8.

Referring to FIGS. 8 and 9, wherein FIG. 8 shows the connection relationship of the first pawl 12, the second pawl 13 and the ratchet wheel 11 of the bidirectional driving device, and FIG. 9 shows a schematic plan view of the connection relationship of the first pawl 12, the second pawl 13 and the ratchet wheel 11 of the bidirectional driving device. The first tooth section 123 of the first pawl 12 is engaged with the ratchet teeth 111 of the ratchet wheel 11, and the second tooth section 133 of the second pawl 13 is engaged with the ratchet teeth 111 of the ratchet wheel 11.

The working principle of the present device is now explained in details by way of several schematic views.

Figure 10:
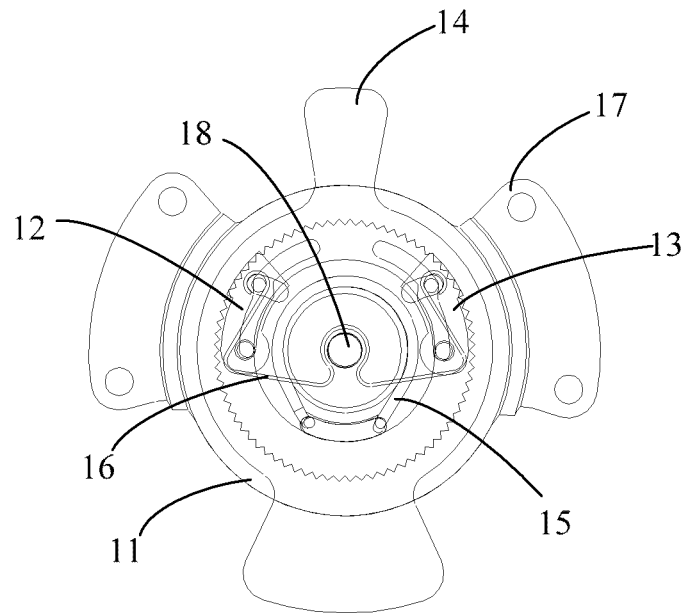
FIG. 10 is a structural schematic view of the bidirectional driving device provided by the embodiment of the present invention in the original state.

Comprehensively referring to FIG. 10 on the basis of FIGS. 1 to 9 as described above, wherein FIG. 10 is a perspective view of the bidirectional driving device. In an original state (that is, where no external force acts upon the movable handle 14 to cause it to move clockwise or counterclockwise), the ratchet wheel 11, the movable handle 14 and the fixed casing 17 is connected through the central shaft, the first tooth section 123 of the first pawl 12 and the second tooth section 133 of the second pawl 13 are engaged with the ratchet teeth 111 of the ratchet wheel 11, the first pawl 12 and the second pawl 13 are respectively connected with the positioning hole 143 and the positioning hole 143' of the movable handle 14 by means of the first positioning column 121 and the second positioning column 131, the projecting arms 151 and 152 of the handle reset spring 15 pass through the third sliding slot 142 of the movable handle 14 and the sliding slot 172 of the fixed casing 17, the positioning part 163 of the pawl reset spring 16 for the central shaft 18 is coupled on the central shaft 18, the first arm hook 161 and the second arm hook 161 of the pawl reset spring 16 are respectively connected with the first boss 122 of the first pawl 12 and the second boss 132 of the second pawl 13, and the first boss 122 and the second boss 132 are respectively located at the middle portions in the first sliding slot 171 and the second sliding slot 171' of the fixed casing 17.

Figure 11:
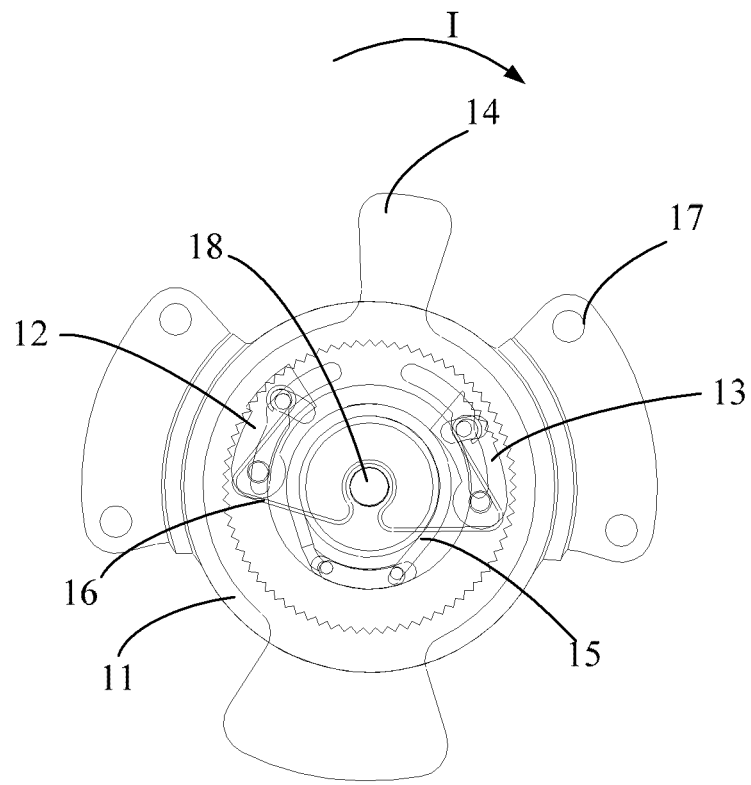
FIG. 11 is a structural schematic view of the bidirectional driving device provided by the embodiment of the present invention when it is subjected to an external force.

When an external force F1 is present to cause the movable handle 14 to rotate with the central shaft 18 as a center in a clockwise direction (i.e. direction I in FIG. 11) relative to the fixed casing 17, referring to FIG. 11, since the first positioning column 121 of the first pawl 12 is connected with the positioning hole 143 of the movable handle 14 and the second positioning column 131 of the second pawl 13 is connected with the positioning hole 143' of the movable handle 14, the rotation of the movable handle 14 drives the first pawl 12 and the second pawl 13 to rotate therewith. Then, the first boss 122 of the first pawl 12 slides in the first sliding slot 171 of the fixed casing 17, and at the same time, the second boss 132 of the second pawl 13 slides in the second sliding slot 171'. Since the radius R1 of the slot section 174 is smaller than the radius R2 of the slot section 173, and the radius R1 of the slot section 174' is smaller than the radius R2 of the slot section 173', the first tooth section 123 of the first pawl 12 is securely engaged with the ratchet teeth 111 of the ratchet wheel 11 while the second tooth section 133 of the second pawl 13 is disengaged from the ratchet teeth 111 of the ratchet wheel 11. Then, as the first pawl 12 rotates clockwise, the ratchet wheel 11 follows to rotate clockwise.

During the movement of the ratchet wheel as described above, the common space of the third sliding slot 142 and the sliding slot 172 is reduced due to the relative movement of the movable handle 14 and the fixed casing 17. Therefore, the handle reset spring 15 is caused to deform, and thus a counterclockwise force F2 acting upon the movable handle 14 is generated.

When said external force F1 is removed, under the force F2 of the handle reset spring 15, the movable handle 14 is rotated counterclockwise and is finally rotated back to the original position. During the rotation, an external force F3 is applied on the ratchet wheel 11 in a direction opposite to the force F2, thus during the resetting of the movable handle 14, the first tooth section 123 of the first pawl 12 is caused to slide on the ratchet teeth 111 of the ratchet wheel 11, while the ratchet wheel 11 does not follow to rotate along with the movable handle 14.

Similarly, when the movable handle 14 is rotated counterclockwise relative to the fixed casing 17, under the positional restriction by the first sliding slot 171 and the second sliding slot 171', the first tooth section 123 of the first pawl 12 is disengaged from the ratchet teeth 111 of the ratchet wheel 11, and the second tooth section 133 of the second pawl 13 is securely engaged with the ratchet teeth of the ratchet wheel 11. As the movable handle 14 rotates, the ratchet wheel 11 is driven to rotate counterclockwise by the second pawl 13. When the external force is removed, under the reaction force from the handle reset spring 16, the movable handle 14 is caused to rotate clockwise and finally returns to the original position.

By repeating the above action, it is possible for the ratchet wheel 11 to rotate in steps with a certain rotation pace. The change of the rotation pace may be achieved by changing the lengths of the first sliding slot 171 and the second sliding slot 171' of the fixed casing 17.

In the bidirectional driving device, during the rotation of the movable handle 14, with the positional restriction by the first sliding slot 171 and the second sliding slot 171', the tooth section (the first tooth section 123 or the second tooth section 133) of one of the first pawl 12 and the second pawl 13 is engaged with the ratchet teeth 111 of the ratchet wheel 11 while the tooth section of the other is disengaged from the ratchet teeth 111 of the ratchet wheel 11 according to the rotary directions of the movable handle 14, such that the ratchet wheel 11 rotates as the movable handle 14 rotates.

Since the movable handle 14 is subjected to the reaction force of the reset spring 15 during the rotation, when the external force is removed, the movable handle 14 can finally returns to the original position. During the resetting, by applying a force acting upon the ratchet wheel 11 in a direction opposite to the return direction, the ratchet wheel 11 is allowed to be in a stationary state relative to the movable handle 14. Therefore, the purpose is achieved that the ratchet wheel 11 rotates at a certain rotation pace during the rotation-resetting-rotation of the movable handle 14.

It should be understood by persons skilled in the art that only the preferred embodiments of the present invention have been disclosed above, and the present invention is not limited thereto. Any non-inventive changes that can be conceived by persons skilled in the art and various improvements and modifications made without departing from the principle of the present invention will all fall within the scope of protection of the present invention.

The invention claimed is:

1. A bidirectional driving device, characterized by comprising a ratchet wheel, a movable handle, a fixed casing and a central shaft passing through the movable handle and the fixed casing, wherein:
   a handle reset spring is disposed at an inner hole of the ratchet wheel, a first free end and a second free end of the handle reset spring are placed in a fourth sliding slot of the fixed casing after passing through a third sliding slot of the movable handle,
   a first pawl and a second pawl located in the same mounting plane are disposed between the ratchet wheel and the movable handle, wherein the first pawl comprises a first boss, a first positioning column, and the second pawl comprises a second boss, a second tooth section and a second positioning column; the first positioning column and the second positioning column are configured for connecting the movable handle, and the first boss and the second boss are placed in a first sliding slot and a second sliding slot of the fixed casing, respectively,
   a pawl reset spring is connected with the first boss, the second boss and the central shaft, such that the first tooth section and the second tooth section have a tendency to move toward ratchet teeth of the ratchet wheel,
   when a force is present to cause the movable handle to rotate with the central shaft as a center, the tooth section of one of the first pawl and the second pawl is engaged with the ratchet teeth, the tooth section of the other is disengaged from the ratchet teeth, whereby the ratchet wheel is driven to rotate synchronically, and when the force is removed, the handle returns to the original position under the action of the handle reset spring.

2. The device according to claim 1, wherein each of the first sliding slot and the second sliding slot is composed of two circular arc slot sections with different radii.

3. The device according to claim 1, wherein the pawl reset spring is disposed between the fixed casing and the movable handle.

4. The device according to claim 1, wherein the handle reset spring is disposed between the movable handle and the mounting plane where the first pawl or the second pawl is located.

5. The device according to claim 1, wherein the pawl reset spring comprises a first arm hook, a second arm hook and a positioning part, the first arm hook and the second arm hook are respectively connected with the first boss and the second boss, and the positioning part is connected with the central shaft.

6. The device according to claim 1, wherein the first boss and the second boss respectively pass through a fifth sliding slot and a sixth sliding slot provided on the movable handle and are connected to the first sliding slot and the second sliding slot of the fixed casing.

7. The device according to claim 1, wherein a height of the first positioning column or the second positioning column is smaller than or equal to a thickness of the movable handle.

8. The device according to claim 7, wherein the first boss or the second boss is a cylindrical boss.

9. The device according to claim 2, wherein the pawl reset spring comprises a first arm hook, a second arm hook and a positioning part, the first arm hook and the second arm hook are respectively connected with the first boss and the second boss, and the positioning part is connected with the central shaft.

10. The device according to claim 3, wherein the pawl reset spring comprises a first arm hook, a second arm hook and a positioning part, the first arm hook and the second arm hook are respectively connected with the first boss and the second boss, and the positioning part is connected with the central shaft.

11. The device according to claim 4, wherein the pawl reset spring comprises a first arm hook, a second arm hook and a positioning part, the first arm hook and the second arm hook are respectively connected with the first boss and the second boss, and the positioning part is connected with the central shaft.

12. The device according to claim 2, wherein the first boss and the second boss respectively pass through a fifth sliding slot and a sixth sliding slot provided on the movable handle and are connected to the first sliding slot and the second sliding slot of the fixed casing.

13. The device according to claim 3, wherein the first boss and the second boss respectively pass through a fifth sliding slot and a sixth sliding slot provided on the movable handle and are connected to the first sliding slot and the second sliding slot of the fixed casing.

14. The device according to claim 4, wherein the first boss and the second boss respectively pass through a fifth sliding slot and a sixth sliding slot provided on the movable handle and are connected to the first sliding slot and the second sliding slot of the fixed casing.

15. The device according to claim 12, wherein a length of the fifth sliding slot or the sixth sliding slot is larger than or equal to a difference between radii of the two circular arc slot sections.

* * * * *